United States Patent
Su et al.

(10) Patent No.: US 10,136,147 B2
(45) Date of Patent: Nov. 20, 2018

(54) EFFICIENT TRANSCODING FOR BACKWARD-COMPATIBLE WIDE DYNAMIC RANGE CODEC

(71) Applicant: Dolby Laboratories Licensing Corporation, San Francisco, CA (US)

(72) Inventors: Guan-Ming Su, Fremont, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 343 days.

(21) Appl. No.: 14/731,656

(22) Filed: Jun. 5, 2015

(65) Prior Publication Data
US 2015/0365688 A1 Dec. 17, 2015

Related U.S. Application Data

(60) Provisional application No. 62/010,908, filed on Jun. 11, 2014.

(51) Int. Cl.
*H04N 19/40* (2014.01)
*H04N 19/30* (2014.01)
(Continued)

(52) U.S. Cl.
CPC ........... *H04N 19/40* (2014.11); *H04L 65/607* (2013.01); *H04N 19/11* (2014.11); *H04N 19/124* (2014.11); *H04N 19/182* (2014.11); *H04N 19/30* (2014.11)

(58) Field of Classification Search
CPC ...... H04N 19/40; H04N 19/11; H04N 19/124; H04N 19/182; H04N 19/30; H04L 65/607
(Continued)

(56) References Cited

U.S. PATENT DOCUMENTS 6,658,057 B1 12/2003 Chen
7,174,049 B2 2/2007 Bhattacharjya
(Continued)

FOREIGN PATENT DOCUMENTS

EP 2077669 7/2009
EP 2666289 11/2013
(Continued)

OTHER PUBLICATIONS

Zhao, M. et al "Content-Adaptive up-Scaling of Chrominance Using Classification of Luminance and Chrominance Data" Electronic Imaging International Society for Optics and Photonics, 2004.
(Continued)

*Primary Examiner* — Jamie J Atala
*Assistant Examiner* — Ayman A Abaza

(57) ABSTRACT

An intermediate bitstream generated by a first-stage transcoding system from an initial transmission package is received. The intermediate bitstream comprises base layer (BL) and enhancement layer (EL) signals. The combination of the BL and EL signals of the intermediate bitstream represents compressed wide dynamic range images. The BL signal of the intermediate bitstream alone represents compressed standard dynamic range images. A targeted transmission package is generated based on the intermediate bitstream. The targeted transmission package comprises BL and EL signals. The BL signal of the targeted transmission package may be directly transcoded from the BL signal of the intermediate bitstream alone.

28 Claims, 8 Drawing Sheets

(51) Int. Cl.
  *H04N 19/11* (2014.01)
  *H04N 19/124* (2014.01)
  *H04N 19/182* (2014.01)
  *H04L 29/06* (2006.01)
(58) Field of Classification Search
  USPC .................................................. 375/240.03
  See application file for complete search history.

(56) References Cited

U.S. PATENT DOCUMENTS

| | | | |
|---|---|---|---|
| 7,876,833 | B2 | 1/2011 | Segall |
| 8,121,191 | B1 * | 2/2012 | Haskell ................ H04N 19/597 |
| | | | 370/395.2 |
| 8,175,168 | B2 | 5/2012 | Sun |
| 8,249,144 | B2 | 8/2012 | Gutman |
| 8,447,121 | B2 | 5/2013 | Shen |
| 2003/0002859 | A1 | 1/2003 | Nitzpon |
| 2006/0088105 | A1 | 4/2006 | Shen |
| 2009/0175358 | A1 * | 7/2009 | Gordon .................. H04N 19/61 |
| | | | 375/240.28 |
| 2011/0080944 | A1 | 4/2011 | Pan |
| 2011/0105146 | A1 * | 5/2011 | Chandrasekaran ... H04L 63/107 |
| | | | 455/456.1 |
| 2012/0317299 | A1 | 12/2012 | Sathianathan |
| 2013/0044183 | A1 * | 2/2013 | Jeon ..................... H04N 19/103 |
| | | | 348/43 |
| 2013/0148029 | A1 | 6/2013 | Gish |
| 2013/0202028 | A1 | 8/2013 | Xin |
| 2013/0254386 | A1 | 9/2013 | Kim |
| 2013/0272374 | A1 | 10/2013 | Eswaran |
| 2013/0297679 | A1 | 11/2013 | Kim |
| 2014/0247869 | A1 | 9/2014 | Su |

FOREIGN PATENT DOCUMENTS

| | | |
|---|---|---|
| KR | 10-2010-0126506 | 12/2010 |
| KR | 10-2014-0005261 | 1/2014 |
| WO | 2013/103522 | 7/2013 |
| WO | 2014/107255 | 7/2014 |
| WO | 2014/160705 | 10/2014 |

OTHER PUBLICATIONS

Kobayashi, T. "Interpolation of Ray-Space Data by Adaptive Filtering" SPIE Electronic Imaging, vol. 3958, 2000, pp. 252-259.
Tsai, An-Chao, et al "Classified Multifilter Up-Sampling Algorithm in Spatial Scalability for H.264/SVC Encoder" IEEE Transactions on Circuits and Systems for Video Technology, vol. 20, No. 6, Jun. 2010, pp. 861-869.
DCI-P3 SMPTE RP 431-2:2011.
ITU-R Recommendation BT.2020, Aug. 2012.
ITU-R Recommendation BT.709-5, Apr. 2002.
ISO/IEC 14496-10:2012, Information Technology-Coding of Audio Visual Objects—Part 10: Advanced Video Coding.
ITU-T Recommendation H.264.
HEVC (ISO/IEC 23008-2 MPEG-H Part 2 version 1).
ITU-T Recommendation H.265, Apr. 2013.
MPEG-2 (ISO/IEC 13818 Part 2 Third Edition, Oct. 1, 2013).
ITU-T Recommendation H.262.
RTP Payload Format for VP9 Video.
VP8 IETF RFC 6386, dated Nov. 2011.
VC-1 (SMPTE ST 421:2013).
Vetro A. et al "Rate-Reduction Transcoding Design for Wireless Video Streaming" Wireless Communications and Mobile Computing, John Wiley & Sons, vol. 2, No. 6, Sep. 1, 2002, pp. 625-641.

* cited by examiner

EFFICIENT TRANSCODING FOR BACKWARD-COMPATIBLE WIDE DYNAMIC RANGE CODEC

CROSS-REFERENCED TO RELATED APPLICATIONS

This application claims the benefit of priority to U.S. Provisional Patent Application Ser. No. 62/010,908, filed on Jun. 11, 2014, each of which is hereby incorporated by reference in its entirety for all purposes.

TECHNICAL FIELD

The present invention relates generally to image processing, and in particular, to encoding, decoding, and representing video.

BACKGROUND ART

Transcoding is used in many video applications. For example, a service provider may need to provide different bitstreams at different bit rates for the purpose of adapting transmission of a video program to time-varying bandwidths in an underlying network transport. The service provider could start from a mezzanine package (e.g., a compressed version adapted from an uncompressed master version, etc.) of the video program and use the mezzanine package to generate different bitstreams to be transmitted at different bit rates.

However, the mezzanine package of a video program typically requires a high bit rate (e.g., 150~200 Mbps, etc.) to transfer between different nodes in a (e.g., internet-based, cloud-based, etc.) distributed computing environment, and a large storage space to store at a recipient node.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Figure 1:
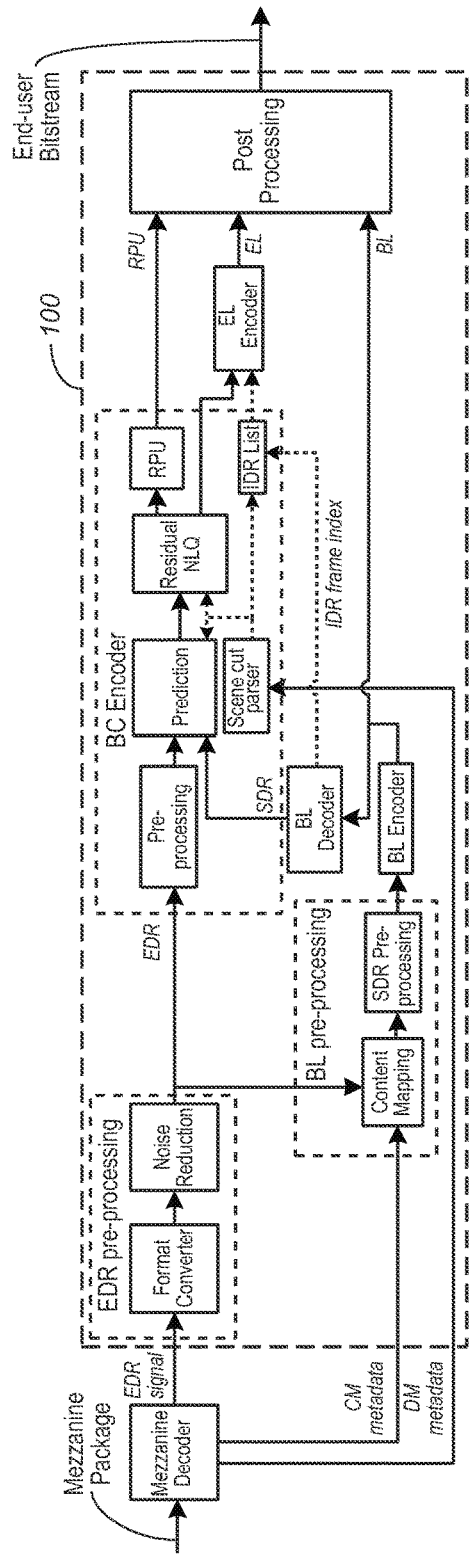
FIG. 1 illustrates an example single-stage transcoding configuration.

Example embodiments, which relate to encoding, decoding, and representing video, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MULTI-LAYER CODEC
3. SINGLE-STAGE TRANSCODING
4. CASCADE TWO-PASS PIPELINE
5. HETEROGENEOUS MULTI-STAGE TRANSCODING
6. BL DIRECT TRANSCODING
7. BL/EL DIRECT TRANSCODING
8. BIT-DEPTH TRANSCODING
9. EXAMPLE PROCESS FLOW
10. IMPLEMENTATION MECHANISMS—HARDWARE OVERVIEW
11. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below.

A production package such as a master version of a movie from a movie studio, etc., can be of a huge file size as the production package often represents a releasable version of the highest spatial resolution, widest dynamic range and largest color gamut available for a media program. The production package can be transcoded into a smaller package such as a mezzanine package, etc., by compressing media data in the production package.

In some embodiments, there is no direct network transport between a content provider with the mezzanine package and an end-user device. Furthermore, even if such a network transport exists, there may not be sufficient bandwidth (e.g., 200 Mps, etc.) to support a direct streaming of the mezzanine package to the end-user device. The mezzanine package can be delivered or transmitted to a media streaming service such as an over-the-top (OTT) content provider, etc., for further transcoding to targeted transmission packages that can be streamed to a wide variety of end-user devices (e.g., consumer devices, etc.), end-user media applications (e.g., smart players, etc.), etc.

The mezzanine package still comprises a large amount of image data (e.g., with a very high spatial resolution much higher than end-user devices, a maximum luminance of up to 10,000 nits, 20,000 nits or even more, a wide color gamut, etc.) derived from the production package, and metadata related to the image data. A mezzanine package as described herein may carry content mapping (CM) metadata, display management (DM) metadata, etc., some or all of which may be derived from the production package.

Transcoding from a mezzanine package to a targeted transmission package can be time consuming (e.g., each transcoding of a media program may take several hours to complete each run, etc.) as time consuming operations such as format conversion operations, content mapping operations, noise reduction operations, interlayer prediction operations, non-linear quantization operations (NLQ), spatial resolution transcoding, frame rate conversion, etc.

Format conversion operations refer to operations (e.g., performed as a part of preprocessing after image content is decoded from a mezzanine package, etc.) that perform format conversion from a first spatial resolution to a second different spatial resolution, from a first color space to a second different color space, etc.

Content mapping operations refer to operations that map image content (e.g., in a mezzanine package, etc.) of a first dynamic range (e.g., first luminance levels, etc.), a first color gamut (e.g., DCI-P3 SMPTE RP 431-2:2011, ITU-R Recommendation BT.2020 (August 2012), or ITU-R Recommendation BT.709-5 (April 2002), each is hereby incorporated herein by reference for all purposes as if fully set forth herein), etc., to mapped image content (e.g., in a base layer (BL) signal of a targeted transmission package, etc.) of a second dynamic range (e.g., second luminance levels, etc.), a second color gamut (e.g., sRGB, etc.), etc. In some embodiments, CM metadata carried by a mezzanine package can be used by the content mapping operations to generate the mapped image content of the second dynamic range, the second color gamut, etc. The mapped image content of the second dynamic range, the second color gamut, etc., may perceptually approximate the pre-mapped image content of the first dynamic range, the first color gamut, etc. In some embodiments, CM metadata can be used to generate the mapped image content for a relatively narrow dynamic range (e.g., SDR, etc.), a relatively small color gamut (e.g., sRGB, etc.), etc., so that the mapped image content is optimized for viewing on an end-user device or display application that supports the relatively narrow dynamic range and the relatively narrow color gamut.

Noise reduction operations refer to operations (e.g., performed as a part of preprocessing after image content is decoded from a mezzanine package, etc.) that remove noises from input image content (e.g., decoded from a mezzanine package, etc.). When a targeted transmission package is to be carried with a smaller bit rate, the noise reduction operations can be performed on the input image content to improve coding efficiency in output image content.

In some embodiments, a targeted transmission package can comprise a multi-layer bitstream comprising multiple signals such as a BL signal comprising BL image content that is optimized for viewing in low-end devices, enhancement layer (EL) signals comprising complementary or EL image content (e.g., residual image content, etc.) that can be combined with the BL image content to reconstruct a version of image content that is optimized for viewing in relatively high-end devices, etc.

Interlayer prediction operations refer to operations that can be performed to exploit inter-layer code redundancy between different layers of the targeted transmission package. For example, the interlayer prediction operations can be used to generate predicted EDR image from the BL image content and to reduce the size of the EL image content by carrying residual EL image content in the form of the differences between the EDR image and the predicted EDR image.

NLQ operations refer to quantization operations that use quanta allocated based on a distribution of values in image content (e.g., residual image content, etc.) to be quantized.

Spatial resolution transcoding refers to transcoding operations that convert one or both of the BL image data and the EL image data from a first spatial resolution to a second different spatial resolution.

Temporal frame rate conversion refers to transcoding operations that convert one or both of the BL image data and the EL image data from a first frame rate to a second different frame rate in the temporal domain.

In some embodiments, a multi-stage transcoding process may be used to transcode an input transmission package such as a mezzanine package, etc., to output transmission packages such as targeted transmission packages for end-user devices and/or display applications, etc. More specifically, the input transmission package can be first transcoded by one or more first-stage transcoding systems into an intermediate bitstream that can be distributed from the first-stage transcoding systems to one or more second-stage transcoding systems with an intermediate bit rate much lower than what is needed to stream the input transmission package but still higher than target bit rates supported by some and even most of end-user devices and/or display applications. The intermediate bitstream can be transmitted from the first-stage transcoding systems to the second-stage transcoding systems (which can be much more numerous than the first-stage transcoding systems) at the intermediate bit rate. The intermediate bitstream can be transcoded by the second-stage transcoding systems (e.g., independent from one another, collaboratively, etc.) into target transmission packages that can be transmitted (e.g., streamed in real time or in near real time, etc.) to a wide variety of targeted bit rates dynamically supported by many or all of end-user devices and/or display applications. In some embodiments, at least one of the first-transcoding systems is located in a different geographic location than that of at least one of the second-transcoding systems.

In some embodiments, the first-stage transcoding systems can be configured to receive mezzanine packages of various media programs by real-time streaming at a very high bit rate (e.g., 200 Mbps or more, etc.) or by retrieving very large files containing the mezzanine packages in non-real time. The first-stage transcoding systems can be further configured with relatively large computation power and rich functionality to complete transcoding operations that may be relatively time consuming, repetitive, etc.

In some embodiments, the intermediate bitstream may be dynamically generated while being transmitted in real time from the first-stage transcoding systems to the second-stage transcoding systems. In some embodiments, the intermediate bitstream may be pre-generated, stored and transmitted/delivered in non-real time from the first-stage transcoding systems to the second-stage transcoding systems.

In some embodiments, the second-stage transcoding systems can be configured to receive the intermediate bitstream by real-time streaming at an intermediate bit rate (e.g., 5-25 times lower than that of the streaming rates of the mezzanine packages, etc.) or by retrieving intermediate size files containing the intermediate bitstream in non-real time. The second-stage transcoding systems can be further configured with computation power and functionality to complete targeted transcoding operations that may be relatively less time consuming, relatively specific to end-user devices and/or display applications, etc. In some embodiments, a targeted transmission package may comprise video segments (e.g., 3-second video chunk, 5-second video chunk, etc.), video chunks (e.g., 3-second video chunk, etc.), etc., that can be pre-generated and stored, and can be dynamically switched for transmitting an end-user device and/or display application based on network conditions experienced by the end-user device and/or display application (e.g., which may be signaled by the end-user device and/or display application back to a streaming server, etc.). In some embodiments, upsampling/downsampling operations may be performed on one or more portions of a targeted transmission package before transmitting to an end-user device and/or display application.

In some embodiments, the first-stage transcoding systems transcode image content decoded from a mezzanine package into an intermediate bitstream comprising BL and EL signals. The second-stage transcoding systems receives and de-multiplexes the intermediate bitstream back into the BL and EL signals.

In some embodiments, as the base layer is already encoded in the first pass, the second-stage transcoding systems directly transcode the BL signal (e.g., HEVC, AVC, VP9, etc.) in the intermediate bitstream into a BL signal in a targeted transmission package.

Additionally, optionally, or alternatively, as the intermediate bit stream also comprises both one or more EL signals encoded in the first pass, the second-stage transcoding systems directly transcode the EL signals (e.g., HEVC, AVC, VP9, etc.) in the intermediate bitstream into the EL signals in a targeted transmission package.

In some embodiments, instead of directly transcoding EL image content in one or more EL signals decoded from the intermediate bitstream, the BL signal decoded from the intermediate bitstream can be used to derive predicted EDR image by one or more prediction modules of the one or more second-stage transcoding systems; the predicted EDR image can be used by the one or more second-stage transcoding systems to derive EL image content to be encoded into the one or more EL signals in the targeted transmission package.

In some embodiments, BL and EL signals encoded in the first pass have the same bit depths as those of BL and EL signals in the targeted transmission package. The second-stage transcoding systems perform transcoding-related operations (e.g., bit rate transcoding, spatial resolution transcoding, temporal frame rate conversion, etc.) without converting the bit depths of the BL and EL signals in the first pass.

In some embodiments, BL and EL signals encoded in the first pass have different bit depths from those of BL and EL signals to be included in the targeted transmission package. The second-stage transcoding systems can be configured to perform bit depth transcoding operations (e.g., from 10-bit HEVC to 8-bit AVC, from 10-bit AVC to 8-bit HEVC, etc.) in addition to other transcoding-related operations (e.g., bit rate transcoding, spatial resolution transcoding, temporal frame rate conversion, etc.).

In some embodiments, instantaneous decoder refresh (IDR) frames in EL and BL signals of a targeted transmission package as described herein are synchronized so that a playback with BL image content only (e.g., SDR image content, etc.) and a playback with a combination of BL and EL image content (e.g., a reconstructed EDR image, high dynamic range image content, etc.) can support fast forward operations, etc., with the same logical times (e.g., the same frame indexes, etc.) within their respective playbacks.

In some embodiments, the first-stage transcoding systems are configured to generate an IDR list identifying IDR frames based at least in part on DM metadata (e.g., comprising scene change information, etc.) decoded from a mezzanine package. The IDR list can be passed to the second-stage transcoding systems by the first-stage transcoding systems as a part of an intermediate bitstream as described herein and extracted from the intermediate bitstream by the second-stage transcoding systems. In the multi-layer transcoding operations performed by the second-stage transcoding systems, the IDR list can be used to generate IDR frames at the same logical time (e.g., the same frame index, etc.) in both of BL image content only and a combination of BL and EL image content in BL and EL signals of targeted transmission packages.

In some example embodiments, mechanisms as described herein form a part of a media processing system, including but not limited to any of: a handheld device, game machine, television, laptop computer, netbook computer, tablet computer, electronic book reader, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. MULTI-LAYER CODEC

In some embodiments, multi-layer codecs may be used to generate or process media signals comprising compressed images (e.g., video images). As used herein, the term "multi-layer codec" may refer to multi-layer encoder and/or decoder that implement a structure of multiple layers in an audio visual signal (e.g., a bitstream, a broadcast signal, a media file, etc.). The multiple layers comprise a base layer (BL) and one or more enhancement layers (ELs). The base and enhancement layers comprise image data derived from the same source images. Image data in the base layer contains compressed image data of a low or partial dynamic range, which may be optimized for rendering on displays of a relatively narrow dynamic range such as a standard dynamic range or SDR. Image data in the multiple layers in combination contains compressed images of a wide dynamic range, which can be decoded and viewed on displays of a relatively wide dynamic range such as a visual dynamic range or VDR, an extended dynamic range or EDR, etc. The term "VDR" or "visual dynamic range" as used herein may refer to a dynamic range wider than a standard dynamic range, and may include, but is not limited to, a wide dynamic range up to the instantaneously perceivable dynamic range and color gamut which human vision can perceive at an instant. The term "EDR" or "extended dynamic range" as used herein may refer to a dynamic range wider than a standard dynamic range, smaller than or the same as a visual dynamic range.

A multi-layer codec as described herein may be implemented with two or more lower bit depth (e.g., 8 bits, etc.) codecs (e.g., gamma-domain codecs, etc.) in the multiple layers in order to support higher bit depth (e.g., 12+ bits, etc.) images in the multiple layers as a whole and to support lower bit depth (e.g., 8 bits, etc.) images in the base layer. For example, one or more gamma-domain encoders can be deployed in a BL signal processing path and/or in one or more EL signal processing paths of a multi-layer encoder as described herein. In some embodiments, at least one gamma-domain decoder can be deployed in the BL signal processing path of a downstream device that is a base-layer only decoder.

Codecs implementing techniques as described herein may be further configured to include inter-layer prediction capabilities to fully exploit statistical redundancy between base layer (BL) image data and original input image data. EL image data may (possibly only) carry residual (or differential) image data, instead of carrying a large amount of wide dynamic range image data without exploiting correlations and statistical redundancy in image data of different layers.

In some example embodiments, data needed for other applications (including but not limited to those not related to perceptual encoding operations, etc.) may also be included with base layer and enhancement layer image data to be delivered from an upstream device to a downstream device. In some example embodiments, additional features and/or orthogonal features may be supported by the base and enhancement layers as described herein.

3. SINGLE-STAGE TRANSCODING

FIG. 1 illustrates an example configuration comprising a mezzanine decoder configured to receive a mezzanine package (e.g., source video content, etc.) and a transcoding system 100 configured to convert the mezzanine package in a single stage to one or more targeted transmission packages (e.g., for end-user display applications, etc.) at one or more targeted bit rates (e.g., 0.5-10 Mbps, etc.).

The transcoding system (100) comprises an extended dynamic range (EDR) pre-processing module configured to perform format conversion and noise reduction, a base layer (BL) pre-processing module configured to perform content mapping from EDR to SDR and noise injection, a base layer (BL) encoder, a prediction module configured to generate RPU metadata and EL data, an enhancement layer (EL) encoder, a post-processing module configured to multiplex BL, EL, RPU, etc., streams together in a single multi-layer bitstream (e.g. an end-user bitstream, etc.), etc.

In some embodiments, the mezzanine decoder is configured to process the mezzanine package (e.g., in compliance with a JPEG 2000 standard, etc.) into an EDR signal comprising 12-bit perceptual quantization (PQ) code words in 16-bit TIFF format; extract color management (e.g., color grading, color timing, etc.) metadata (CM metadata) and display management metadata (DM metadata) from the mezzanine package; etc.

CM metadata as described herein may include, but is not limited to only, any of color adjustments, luminance adjustments, white point adjustments, etc., made automatically or manually in a production system in the process of producing the production package. The CM metadata can be used in content mapping operations to map image content carried in the mezzanine package perceptually correctly to mapped image content for a relatively narrow dynamic range (e.g., SDR, etc.), a relatively small color gamut (e.g., sRGB, etc.) so that the mapped image content is optimized for viewing on a class of end-user devices and/or display applications that support the relatively narrow dynamic range and the relatively narrow color gamut.

DM metadata as described herein may include, but is not limited to, any of: display management information such as scene information, etc., that can be used by a specific type of end-user devices and/or display applications to get the best results in scene-based prediction, in reconstructing images, in supporting playback operations, fast forwarding, frame skipping, etc., on the specific type of end-user devices.

In some embodiments, the EDR pre-processing module is configured to receive the EDR signal from the mezzanine decoder, pre-process EDR content in the EDR signal, etc. The EDR pre-processing module may be configured with one or more sub-modules to perform the EDR pre-processing operations on the EDR content. For example, the EDR pre-processing module may comprise a format converter that performs format conversion operations (e.g., from PQ-based code words to gamma-based code values, from an input color space to a YUV color space, from a first sampling format to a second sampling format, etc.), a noise reduction module that performs noise reduction operations in the processed signal, etc., relating to the EDR content, etc.

The BL pre-processing module is configured to receive the pre-processed EDR content from the EDR pre-processing module, receive the CM metadata from the mezzanine decoder, perform content mapping operations on the pre-processed EDR content to convert the pre-processed EDR signal into SDR content, etc. Additionally, optionally, or alternatively, the BL pre-processing module may comprise one or more sub-modules to perform SDR pre-processing (e.g., injecting noise to reduce or remove banding effects, etc.) on the SDR content.

In some embodiments, the BL encoder can be a backwards-compatible video codec configured to encode the pre-processed SDR content into an 8/10 bit SDR signal, etc. In some embodiments, the 8/10 bit SDR signal is optimized for viewing on SDR displays.

In some embodiments, the prediction module is configured to receive the pre-processed EDR content from the EDR pre-processing module; receive SDR content decoded by a BL decoder based on the 8/10 bit SDR signal; perform further pre-processing on the received EDR content from the EDR pre-processing module; generate, based on the further pre-processed EDR content and the decoded SDR content, EL data (e.g., residual data, etc.) and prediction parameters, etc.

The prediction module may comprise a same-scene parser configured to receive display management (DM) data in the mezzanine package as decoded by the mezzanine decoder, parse scene change information (e.g., determining whether an image frame that is being processed is a part of a current scene being processed, etc.) based on the DM metadata, provide the scene change information (e.g., whether a frame is in the current scene, whether a frame starts a new scene, etc.) to a residual non-linear quantization (NLQ) sub-module, provide the scene change information to an IDR (instantaneous decoder refresh) list sub-module, etc.

In some embodiments, the residual NLQ sub-module is configured to generate an RPU (reference processing unit) signal that comprises the prediction parameters, NLQ parameters, scene change parameters, etc.; quantize the (e.g., initial, etc.) EL data generated by the prediction module; provide the quantized EL data to the EL encoder; etc.

In some embodiments, the IDR list sub-module is configured to receive the scene change information from the scene-cut parser, receive additional scene change information from the prediction module, receive IDR frame index information from the BL decoder, generate an IDR (e.g., frame, etc.) list based on the information received from the scene cut parser, the prediction module and the BL decoder, etc. In some embodiments, the EL encoder is configured to receive the quantized EL data from the residual NLQ module, receive the IDR list from the IDR list sub-module, generate an EL signal based at least in part on the quantized EL data and the IDR list, etc.

In some embodiments, the post-processing module is configured to receive the BL signal, the EL signal and the RPU signal and multiplex the three signals (or streams) together to a multi-layer signal (e.g., a multi-layer bitstream, etc.) as a targeted transmission package (e.g., supporting a targeted bit rate, resolution, dynamic range, player, platform, etc.).

In some embodiments, the transcoding system (100) of FIG. 1 can be configured to support transcoding a mezzanine package into a number of different targeted transmission packages for different targeted bit rates. For example, the transcoding system (100) can receive the mezzanine package with a high bit rate (e.g., 100~500 Mbps, etc.), convert the mezzanine package with processing operations dependent on the targeted bit rates into the targeted transmission packages, and transmit the targeted transmission packages to one or more end-user devices at a relatively low bit rate (e.g., 0.5-10 Mbps, etc.). This configuration requires large storage capacity and high bit rates to distribute mezzanine packages of a wide variety of media programs to transcoding systems configured to generate targeted transmission packages for end-user display applications.

Techniques as described herein can be implemented to avoid or reduce the requirements for large storage capacity and high bit rates to distribute mezzanine packages. These techniques support transcoding a mezzanine package with multiple stages of transcoding by multiple transcoding systems in multiple locations (e.g., in the internet, in a network cloud spanning the multiple locations, etc.). In some embodiments, the mezzanine package can be converted in one or more first stages of transcoding by one or more first transcoding systems into an intermediate transmission package that requires intermediate bit rates (e.g., 10-100 Mbps, etc.) to transmit. The transmission package can be transmitted to one or more second transcoding systems configured to converted the intermediate transmission packages in one or more second-stages of transcoding into targeted (e.g., end-user, etc.) transmission packages. Some or all of the conversion operations as described herein can be performed in real time or non-real time. In an example, in some embodiments, the intermediate transmission package can be transmitted to the second transcoding systems for storage; the second transcoding systems can perform the second-stages of transcoding in non-real time. In another example, in some embodiments, some or all of the targeted transmission packages can be generated by one or more of the second transcoding system in real time, in non-real time, part in real time part in non-real time, etc.

4. CASCADE TWO-PASS PIPELINE

Figure 2:
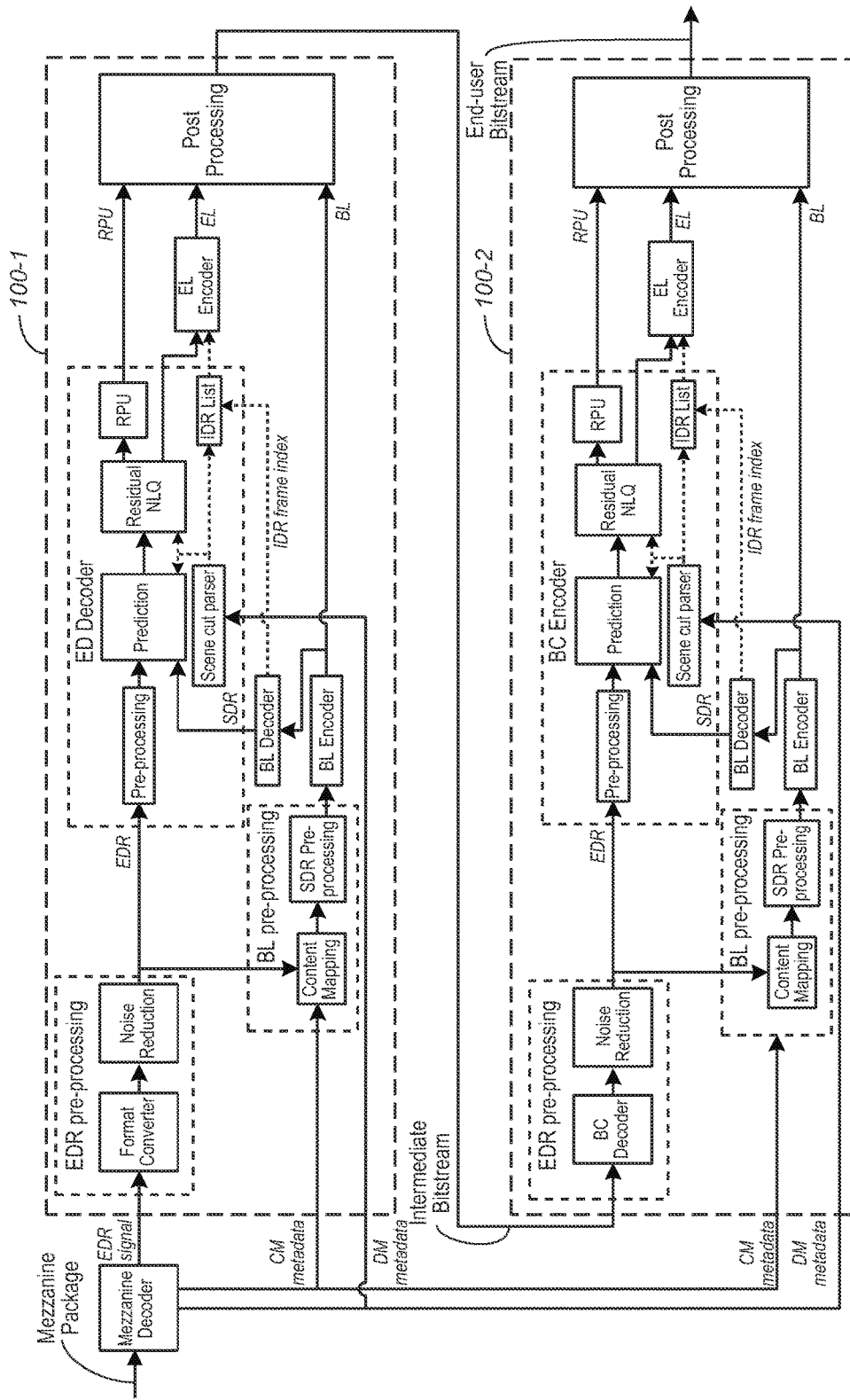
FIG. 2 through FIG. 6 illustrates example multi-stage transcoding configurations.

FIG. 2 illustrates an example configuration comprising a mezzanine decoder configured to receive a mezzanine package (e.g., source video content, etc.) and two or more transcoding systems (e.g., 100-1, 100-2, etc.) configured to convert the mezzanine package in two or more stages to one or more targeted transmission packages (e.g., for end-user display applications, etc.) at one or more targeted bit rates (e.g., 0.5-10 Mbps, etc.).

In some embodiments, the mezzanine decoder is configured to process the mezzanine package (e.g., in compliance with a JPEG 2000 standard, etc.) into an EDR signal comprising 12-bit perceptual quantization (PQ) code words in 16-bit TIFF format; extract color management (e.g., color grading, color timing, etc.) metadata (CM metadata) and display management metadata (DM metadata) from the mezzanine package; provide the EDR signal, the CM metadata, the DM metadata, etc., directly to the transcoding system (100-1); provide the CM metadata, the DM metadata, etc., by way of the intermediate bitstream to the transcoding system (100-2); etc.

In some embodiments, each of the two or more transcoding system (100-1 and 100-2) comprises a similar configuration as the transcoding system (100) of FIG. 1. In some embodiments, each of the two or more stages of transcoding of FIG. 2 involves performing the same or substantially similar types of operations. In some embodiments, the transcoding system (100-1) is configured to create an intermediate bitstream (e.g., at an intermediate bit rate of 10 to 100 Mbps, etc.) in the first pass (or stage) of transcoding. In the second pass (or stage) of transcoding, the transcoding system (100-2) is configured to create the one or more targeted transmission packages from the intermediate bitstream received from the transcoding system (100-1), the CM and DM metadata from the mezzanine decoder, etc. The transcoding system (100-2) may comprise a backwards-compatible decoder configured to decode the intermediate bitstream and retrieve/reconstruct EDR content from the intermediate bitstream. This reconstructed EDR content can be further operated by other modules in the transcoding system (100-2) to generate the one or more targeted transmission packages suitable for distribution to end-user display applications.

It should be noted that transcoding mezzanine packages into targeted transmission packages with this configuration can be very time consuming, as all modules, including noise reduction, content mapping, and SDR-EDR prediction, are performed twice or more. Additionally, optionally, or alternatively, one or more of spatial resolution transcoding, temporal frame rate conversion, etc., can also be performed in one or both of the first pass and the second pass of transcoding to convert one or both of the BL image data and the EL image data from a first spatial resolution to a second different spatial resolution, to convert one or both of the BL image data and the EL image data from a first frame rate to a second different frame rate in the temporal domain, etc.

5. HETEROGENEOUS MULTI-STAGE TRANSCODING

Figure 3:
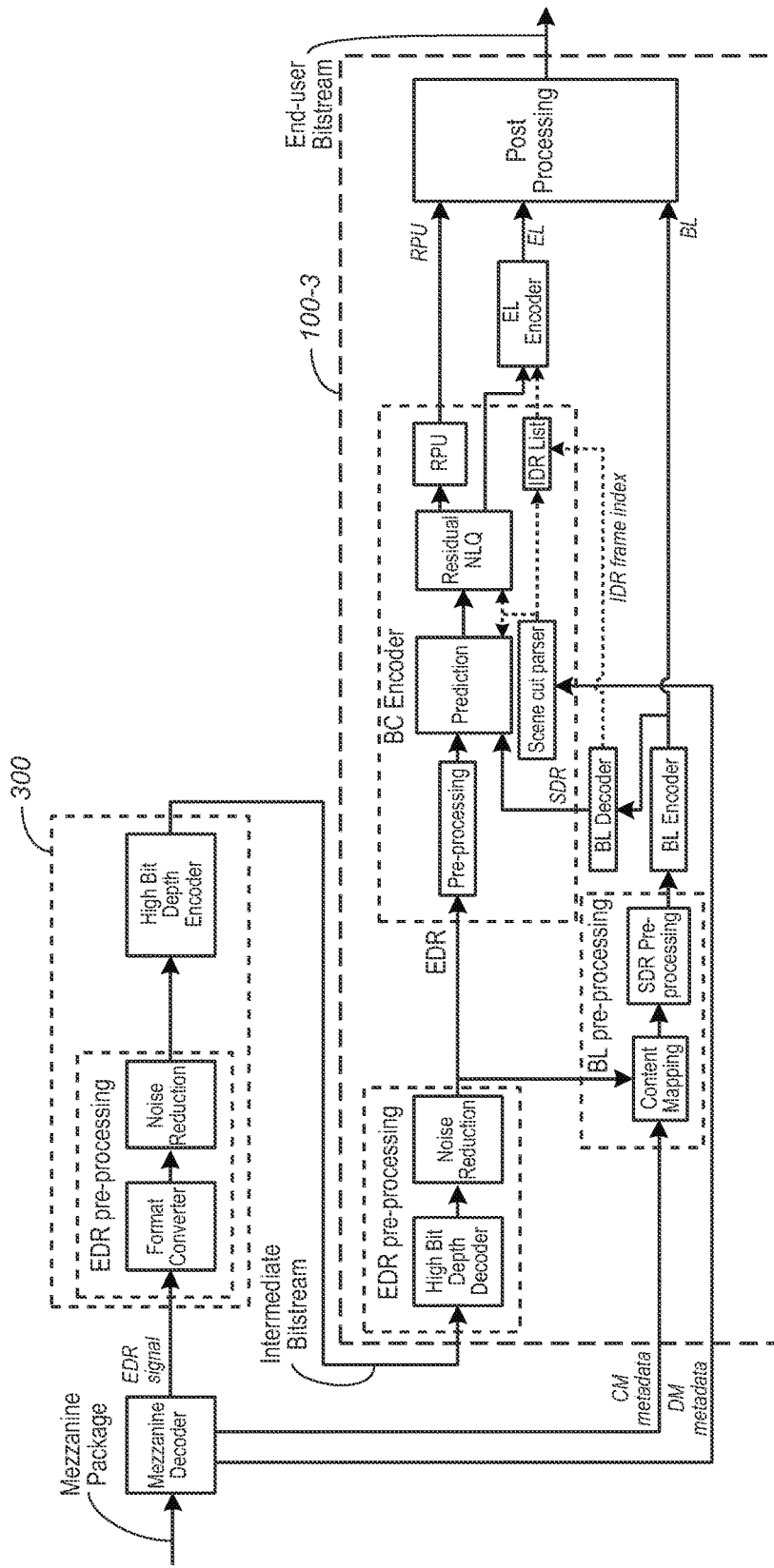

FIG. 3 illustrates an example configuration comprising a mezzanine decoder configured to receive a mezzanine package (e.g., source video content, etc.), a first-stage codec system 300, and one or more second-stage transcoding systems (e.g., 100-3, etc.). The first stage codec and the second-stage transcoding systems are configured to convert the mezzanine package in two or more stages to one or more targeted transmission packages (e.g., for end-user display applications, etc.) at one or more targeted bit rates (e.g., 0.5-10 Mbps, etc.).

Examples of the first-stage codec system include, but are not limited to, a high bit depth signal layer codec (e.g., non-backwards-compatible reshaping codec, backwards-compatible codec, a single layer codec, a dual layer codec, etc.), a codec implementing the high bit depth settings/requirements/options in AVC/HEVC, etc. Some examples of non-backwards-compatible reshaping codec are described in U.S. Patent Application No. 61/861,555, filed on Aug. 2, 2013, owned by the Applicant, the content of which are incorporated by reference for all purposes as if fully set forth herein. Some examples of backwards-compatible reshaping codec are described in U.S. Patent Application No. 61/555,978, filed on Nov. 4, 2011, owned by the Applicant, the content of which are incorporated by reference for all purposes as if fully set forth herein.

In some embodiments, the mezzanine decoder is configured to process the mezzanine package (e.g., in compliance with a JPEG 2000 standard, etc.) into an EDR signal comprising 12-bit perceptual quantization (PQ) code words in 16-bit TIFF format; extract color management (e.g., color grading, color timing, etc.) metadata (CM metadata) and display management metadata (DM metadata) from the mezzanine package; provide the EDR signal, the CM metadata, the DM metadata, etc., directly to the first-stage codec system (300); provide the CM metadata, the DM metadata, etc., by way of the intermediate bitstream to the second-stage transcoding systems (e.g., 100-3); etc.

In some embodiments, the transcoding system (100-3) is configured to create an intermediate bitstream (e.g., at an intermediate bit rate of 10 to 100 Mbps, etc.) in the first pass (or stage) of transcoding. In some embodiments, the first stage codec system comprises an EDR pre-processing module configured to receive the EDR signal from the mezzanine decoder, pre-process EDR content in the EDR signal, etc. The EDR pre-processing module may be configured with one or more sub-modules to perform the EDR pre-processing operations on the EDR content. For example, the EDR pre-processing module may comprise a format converter that performs format conversion operations (e.g., from PQ-based code words to gamma-based code values, from an input color space to a YUV color space, from a first sampling format to a second sampling format, etc.), a noise reduction module that performs noise reduction operations in the processed signal, etc., relating to the EDR content, etc. In some embodiments, the pre-processed EDR content is sent to a high bit depth encoder in the first stage code system (300) to generate the intermediate bitstream. The intermediate bitstream is then transmitted from the first stage codec system (300) to the second-stage transcoding systems (e.g., 100-3, etc.).

In some embodiments, the transcoding system (100-3) comprises a similar configuration as the transcoding system (100) of FIG. 1. In the second pass (or stage) of transcoding, the transcoding system (100-3) is configured to create the one or more targeted transmission packages from the intermediate bitstream received from the first stage codec system (300), the CM and DM metadata from the mezzanine decoder, etc. The transcoding system (100-3) may comprise an EDR high bit depth decoder configured to decode the intermediate bitstream and retrieve/reconstruct EDR content from the intermediate bitstream. This reconstructed EDR content can be further operated by other modules in the transcoding system (100-3) to generate the one or more targeted transmission packages suitable for distribution to end-user display applications.

In some embodiments, the intermediate bitstream generated by the first stage codec system (300) comprises a compressed EDR signal carrying EDR content in an original bit depth (e.g., the same as the bit depth of the uncompressed EDR signal generated by the mezzanine decoder, etc.). In some embodiments, the compressed EDR signal represents a mid-sized mezzanine package as compared with the (original) mezzanine package. The transcoding system (100-3) can be configured to receive and reconstruct EDR content in the original bit depth, transcode the reconstructed EDR content into a targeted transmission package comprising a multi-layer bitstream. BL and EL signals carried in the multi-layer bitstream can be set to their respective bit depths that match those (e.g., 8 bits, 10 bits, etc.) of a targeted platform, a targeted media application, etc. Additionally, optionally, or alternatively, one or more of spatial resolution transcoding, temporal frame rate conversion, etc., can also be performed in one or both of the first pass and the second pass of transcoding to convert one or both of the BL image data and the EL image data from a first spatial resolution to a second different spatial resolution, to convert one or both of the BL image data and the EL image data from a first frame rate to a second different frame rate in the temporal domain, etc.

6. BL DIRECT TRANSCODING

Figure 4:
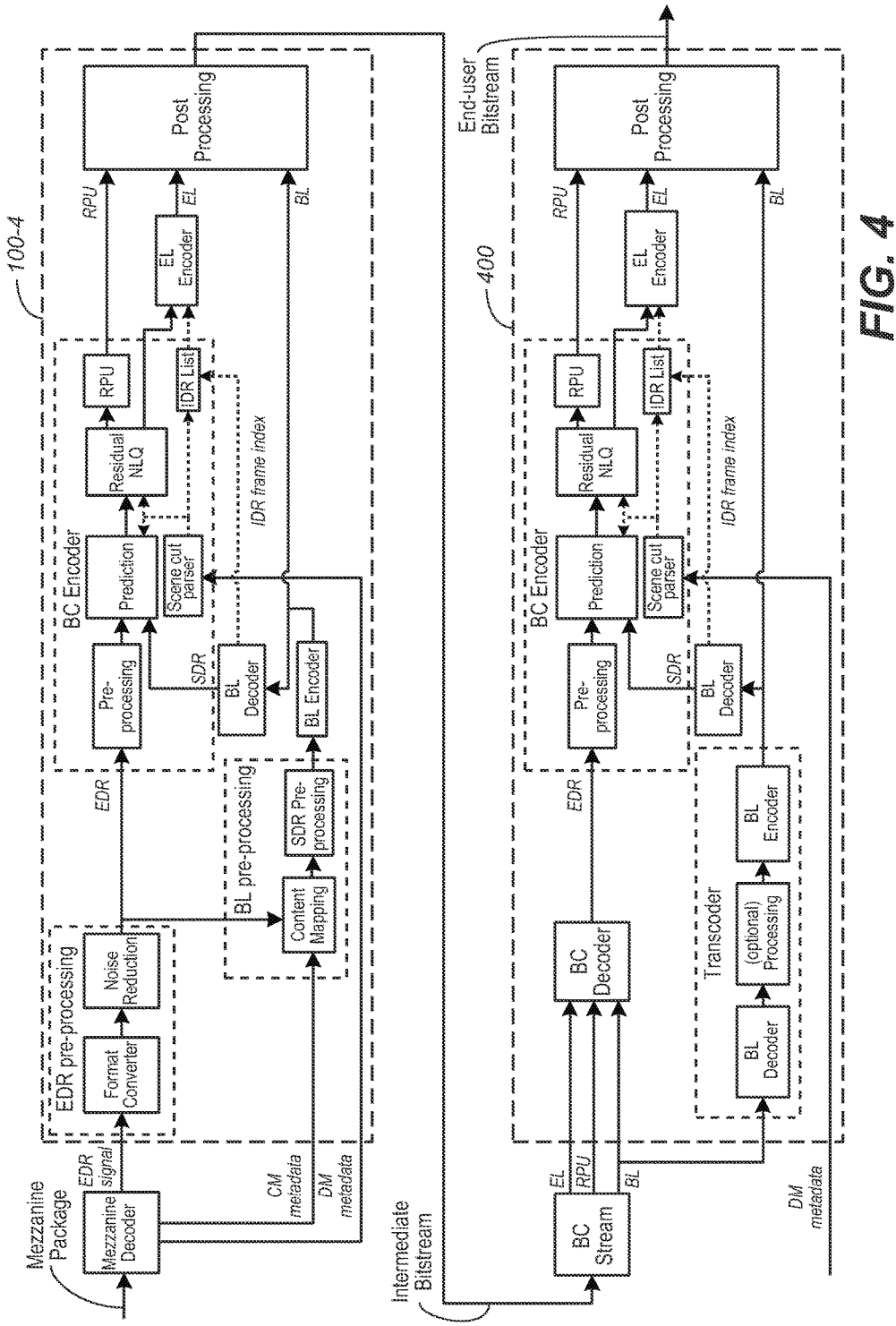

FIG. 4 illustrates an example configuration comprising a mezzanine decoder configured to receive a mezzanine package (e.g., source video content, etc.), a first-stage transcoding system 100-4, and one or more second-stage transcoding systems (e.g., 400, etc.). The first stage and the second-stage transcoding systems are configured to convert the mezzanine package in two or more stages to one or more targeted transmission packages (e.g., for end-user display applications, etc.) at one or more targeted bit rates (e.g., 0.5-10 Mbps, etc.). This configuration can be used to reduce computation complexity, for example, by eliminating noise reduction and content mapping operations in the second pass (or stage) of transcoding.

In some embodiments, the mezzanine decoder is configured to process the mezzanine package (e.g., in compliance with a JPEG 2000 standard, etc.) into an EDR signal comprising 12-bit perceptual quantization (PQ) code words in 16-bit TIFF format; extract color management (e.g., color grading, color timing, etc.) metadata (CM metadata) and display management metadata (DM metadata) from the mezzanine package; provide the EDR signal, the CM metadata, the DM metadata, etc., directly to the transcoding system (100-4); provide the DM metadata, etc., by way of the intermediate bitstream to the transcoding system (400); etc.

In some embodiments, the transcoding system (100-4) comprises a similar configuration as the transcoding system (100) of FIG. 1. In some embodiments, the transcoding system (100-1) is configured to create an intermediate bitstream (e.g., at an intermediate bit rate of 10 to 100 Mbps, etc.) in the first pass (or stage) of transcoding. In some embodiments, the transcoding system (100-4) of FIG. 4 involves performing the same or substantially similar types of operations to those performed by the transcoding system (100-1) of FIG. 2.

In the second pass (or stage) of transcoding, the transcoding system (400) is configured to create the one or more targeted transmission packages from the intermediate bitstream received from the transcoding system (100-4), the DM metadata from the mezzanine decoder, etc.

In some embodiments, each of two or more of the multiple transcoding systems in the configuration of FIG. 4 is configured to perform EL and BL operations on image data respectively arried in base and enhancement layers.

For the purpose of illustration, the intermediate bitstream represents a multi-layer backwards-compatible (BC) stream comprising EL, RPU, and BL signals. The transcoding system (400) may comprise a backwards-compatible decoder (BC decoder) configured to decode the intermediate bitstream into EL, RPU and BL signals retrieve/reconstruct EDR content from the intermediate bitstream. This reconstructed EDR content can be further operated by other modules in the transcoding system (400) for the purpose of generating the one or more targeted transmission packages suitable for distribution to end-user display applications.

As the base layer is already encoded in the first pass, image data in the BL can be directly transcoded to generate a low bit rate (e.g., a targeted bit rate, etc.) BL signal to be carried in the multi-layer bitstream as one of the one or more targeted transmission packages. Furthermore, a BL decoder can decode the low bit rate BL signal to generate transcoded reconstructed BL data (e.g., YUV data, etc.), and send to the prediction module of the second-stage transcoding system (400).

In some embodiments, the transcoding systems comprise one or more modules including but not limited to the prediction module, that are configured to receive the EDR content from the BC decoder; receive the transcoded restricted SDR content from the BL decoder; perform further pre-processing on the received EDR content from the BC decoder; generate, based on the further pre-processed EDR content and the decoded SDR content, EL data (e.g., residual data, etc.) and prediction parameters, etc.

The prediction module may comprise a same-scene parser configured to receive display management (DM) data in the mezzanine package as decoded by the mezzanine decoder, parse scene change information (e.g., determining whether an image frame that is being processed is a part of a current scene being processed, etc.) based on the DM metadata, provide the scene change information (e.g., whether a frame is in the current scene, whether a frame starts a new scene, etc.) to a residual non-linear quantization (NLQ) sub-module, provide the scene change information to an IDR (instantaneous decoder refresh) list sub-module, etc.

In some embodiments, the residual NLQ sub-module is configured to generate an RPU (reference processing unit) signal that comprises the prediction parameters, NLQ parameters, scene change parameters, etc.; quantize the (e.g., initial, etc.) EL data generated by the prediction module; provide the quantized EL data to the EL encoder; etc.

In some embodiments, the transcoding system (400) receives the DM metadata by way of the intermediate bitstream. The transcoding system (400), or a scene cut parser therein, can directly transcode the received DM metadata into a low bit depth representation, obtain scene change information from the DM metadata to enforce scene boundary as IDR frames in EL. In some embodiments, additional information is transmitted from a first stage transcoding system (e.g., 100-4, etc.) to a second-stage transcoding system (e.g., 400, etc.) and used by the second-stage transcoding system (e.g., 400, etc.) to perform group-of-pictures (GOP) alignment operations between the base layer and the enhancement layers.

In some embodiments, the IDR list sub-module is configured to receive the scene change information from the scene-cut parser, receive additional scene change information from the prediction module, receive IDR frame index information from the BL decoder, generate an IDR (e.g., frame, etc.) list based on the information received from the scene cut parser, the prediction module and the BL decoder, etc. In some embodiments, the EL encoder is configured to receive the quantized EL data from the residual NLQ module; receive the IDR list from the IDR list sub-module; generate an EL signal based at least in part on the quantized EL data and the IDR list; etc.

In some embodiments, the post-processing module of the transcoding system (400) is configured to receive the BL signal, the EL signal and the RPU signal; multiplex the three signals (or streams) together to a multi-layer signal (e.g., a multi-layer bitstream, etc.) as a targeted transmission package (e.g., supporting a targeted bit rate, resolution, dynamic range, player, platform, etc.); etc.

In the configuration of FIG. 4, the BL image data in the intermediate bitstream (e.g., a mid rate bitstream, etc.) can have a different bit depth from that of the BL image data of a targeted transmission package (e.g., a low bit rate bitstream, etc.). Similarly, the EL image data in the intermediate bitstream can have a different bit depth from that of the EL image data of the targeted transmission package. For example, the intermediate bitstream may comprise 10-bit image data in one or more of the base and enhancement layers. After the intermediate bitstream is delivered to other nodes (e.g., second-stage or later transcoding systems in a network cloud, etc.) for processing, if a targeted platform requests BL image data as 8-bit image data, the BL image data in the intermediate bitstream can be transcoded by one or more of the other nodes from 10-bit to 8-bit. Operations performed in transcoding may include but are not limited to prediction and residual quantization operation on the EL image data in the 8-bit representation, etc. Additionally, optionally, or alternatively, noise injection can be enabled in the second pass of transcoding to remove or alleviate false contouring from 8-bit coding operations. Similarly, one or more of spatial resolution transcoding, temporal frame rate conversion, etc., can also be performed in one or both of the first pass and the second pass of transcoding to convert one or both of the BL image data and the EL image data from a first spatial resolution to a second different spatial resolution, to convert one or both of the BL image data and the EL image data from a first frame rate to a second different frame rate in the temporal domain, etc.

7. BL/EL DIRECT TRANSCODING

Figure 5:
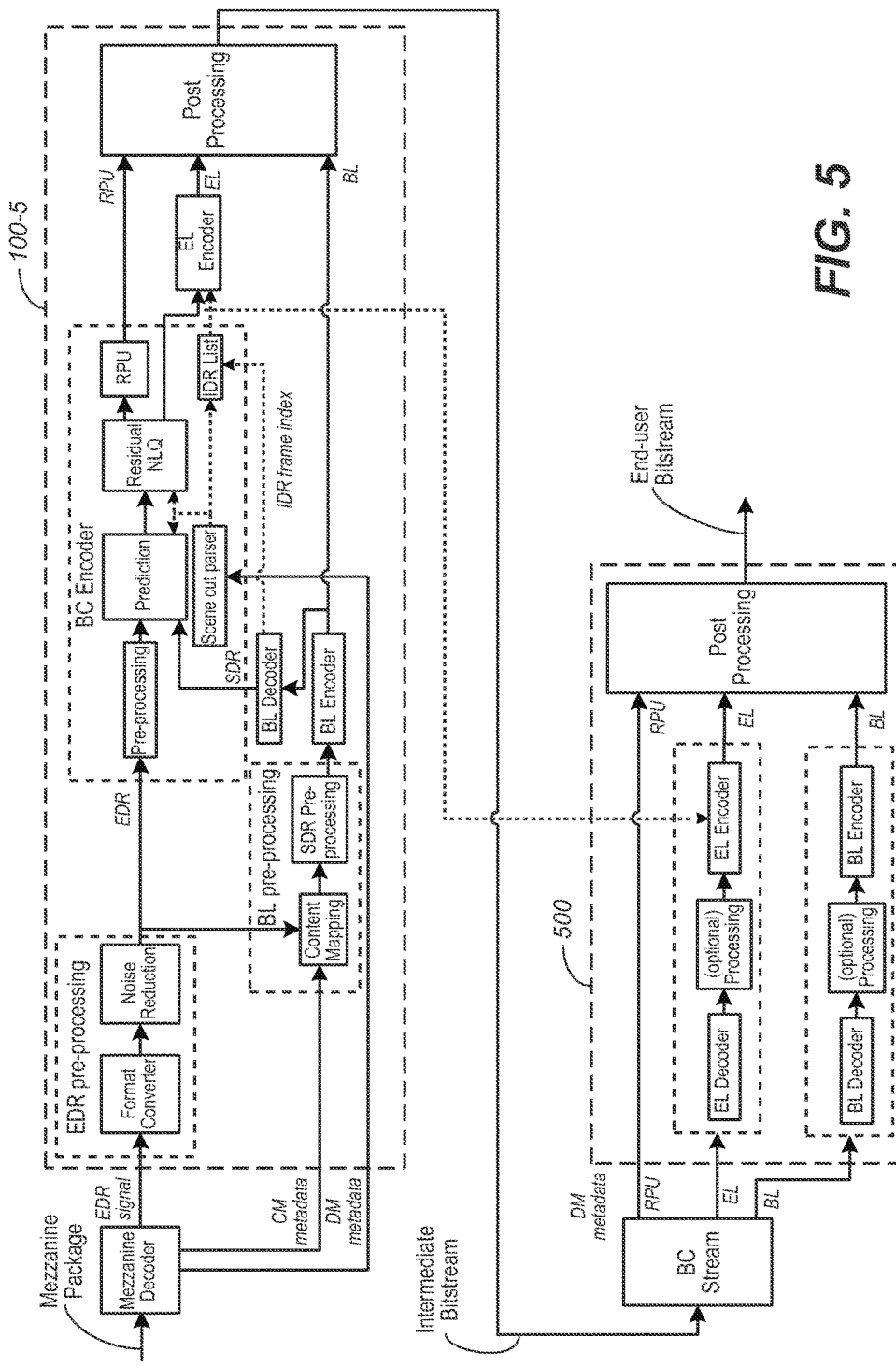

FIG. 5 illustrates an example configuration comprising a mezzanine decoder configured to receive a mezzanine package (e.g., source video content, etc.), a first-stage transcoding system 100-5, and one or more second-stage transcoding systems (e.g., 500, etc.). The first stage and the second-stage transcoding systems are configured to convert the mezzanine package in two or more stages to one or more targeted transmission packages (e.g., for end-user display applications, etc.) at one or more targeted bit rates (e.g., 0.5-10 Mbps, etc.).

In some embodiments, the mezzanine decoder is configured to process the mezzanine package (e.g., in compliance with a JPEG 2000 standard, etc.) into an EDR signal comprising 12-bit perceptual quantization (PQ) code words in 16-bit TIFF format; extract color management (e.g., color grading, color timing, etc.) metadata (CM metadata) and display management metadata (DM metadata) from the mezzanine package; provide the EDR signal, the CM metadata, the DM metadata, etc., directly to the transcoding system (100-5); provide the DM metadata, etc., by way of the intermediate bitstream to the transcoding system (500); etc.

In some embodiments, the transcoding system (100-5) comprises a similar configuration as the transcoding system (100) of FIG. 1. In some embodiments, the transcoding system (100-1) is configured to create an intermediate bitstream (e.g., at an intermediate bit rate of 10 to 100 Mbps, etc.) in the first pass (or stage) of transcoding. In some embodiments, the transcoding system (100-5) of FIG. 5 involves performing the same or substantially similar types of operations to those performed by the transcoding system (100-1) of FIG. 2.

In the second pass (or stage) of transcoding, the transcoding system (500) is configured to create the one or more targeted transmission packages from the intermediate bitstream received from the transcoding system (100-5), the DM metadata from the mezzanine decoder, etc.

In some embodiments, each of two or more of the multiple transcoding systems in the configuration of FIG. 5 is configured to perform EL and BL operations on image data respectively carried in base and enhancement layers.

For the purpose of illustration, the intermediate bitstream represents a multi-layer backwards-compatible (BC) stream comprising EL, RPU, and BL signals. As each of the base and enhancement layers is already encoded in the first pass, image data in each such layer can be directly transcoded to generate a low bit rate (e.g., a targeted bit rate, etc.) BL or EL signal to be carried in the multi-layer bitstream as one of the one or more targeted transmission packages.

As in the configuration of FIG. 4, this configuration as illustrated in FIG. 5 can be used to reduce computation complexity, for example, by eliminating noise reduction and content mapping operations in the second pass (or stage) of transcoding. Furthermore, the transcoding system (500) can transcode (e.g., independently, etc.) both BL and EL image data into target bit rates without needing to perform prediction operation operations in the second pass of transcoding. For example, an EL decoder, an EL encoder, and/or optional processing modules can be used to transcode the EL image data derived from the intermediate bitstream into a targeted EL signal to be sent to the post processing module of the transcoding system (500). Similarly, a BL decoder, an BL encoder, and/or optional processing modules can be used to transcode the BL image data derived from the intermediate bitstream into a targeted BL signal to be sent to the post processing module of the transcoding system (500). In some embodiments, the same RPU signal carried in the intermediate bitstream can be maintained by the transcoding system (500) in the targeted transmission package by directly providing the RPU signal to the post processing module of the transcoding system (500).

In some embodiments, the transcoding system (500) receives the DM metadata by way of the intermediate bitstream. In some embodiments, additional information (e.g., the IDR list from the IDR list sub-module in the transcoding system 100-5 to the EL encoder in the transcoding system 500, etc.) is transmitted from a first stage transcoding system (e.g., 100-5, etc.) to a second-stage transcoding system (e.g., 500, etc.) and used by the second-stage transcoding system (e.g., 500, etc.) to perform group-of-pictures (GOP) alignment operations between the base layer and the enhancement layers.

In some embodiments, the post-processing module of the transcoding system (500) is configured to receive the BL signal, the EL signal and the RPU signal and multiplex the three signals (or streams) together to a multi-layer signal (e.g., a multi-layer bitstream, etc.) as a targeted transmission package (e.g., supporting a targeted bit rate, resolution, dynamic range, player, platform, etc.).

In some embodiments, one or more of spatial resolution transcoding, temporal frame rate conversion, etc., can also be performed in one or both of the first pass and the second pass of transcoding to convert one or both of the BL image data and the EL image data from a first spatial resolution to a second different spatial resolution, to convert one or both of the BL image data and the EL image data from a first frame rate to a second different frame rate in the temporal domain, etc.

The configuration of FIG. 5 does not require a (e.g., BC, etc.) decoder in the second pass to generate EDR data for prediction purposes. In some embodiments, additional stages of transcoding can be easily added into this configuration; for example, a third-stage transcoding system can be added after the second-stage transcoding system (500) to further transcode the targeted bitstreams from the second-stage transcoding system (500) into additional targeted bitstreams. Thus, adaptive video streaming can be deployed quickly and easily. In some operating scenarios, targeted transmission package for multiple bit rates of BL image data and/or multiple bit rates of EL image data can be prepared with relatively short times. Furthermore, transmission packages with different bit rates can be generated independently in the second- or later-stages of transcoding from the same intermediate bitstream as generated in the first pass.

In some embodiments, in the first stage transcoding system (100-5), SDR data (or BL data) provided to the prediction module does not need to be decoded BL data from a BL decoder. In some embodiments, the SDR data can be pre-processed (e.g., uncompressed, etc.) BL content directly from the SDR pre-processing module. In some embodiments, the intermediate bitstream as generated by the transcoding system (100-5) comprises BL and EL data with the same bit depths as those of BL and EL data in the targeted transmission packages.

8. BIT-DEPTH TRANSCODING

Figure 6:
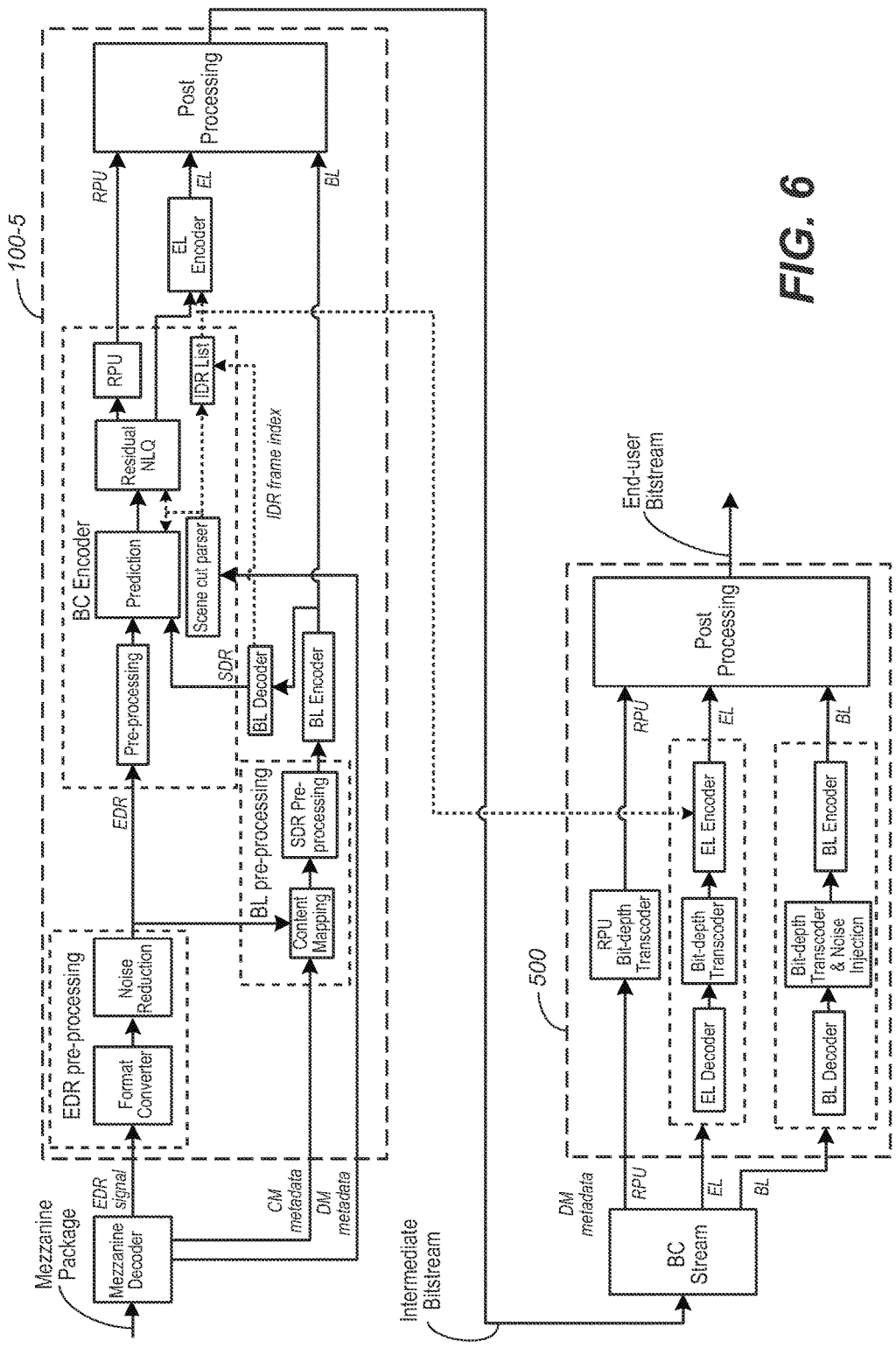

FIG. 6 illustrates an alternative example configuration to that of FIG. 5. In this alternative configuration, additionally, optionally, or alternatively, the transcoding system (500) of FIG. 6 comprises an RPU bit depth transcode, an EL module comprising a bit depth transcoder, and a BL module comprising a bit depth transcoder and a noise injection sub-module.

The alternative configuration of FIG. 6 does not need bit depths of the base and enhancement layers in the intermediate bitstream to be the same as those of the base and enhancement layers in the targeted transmission packages. If the bit depths of the base and enhancement layers in the intermediate bitstream are different from those of the base and enhancement layers in the targeted transmission packages, the bit depth transcoders in the BL and EL modules can be used to convert the bit depths in the intermediate bitstream to the bit depths in the targeted transmission packages.

In the BL processing, the bit-depth transcoder in the BL module can be configured to perform a simple bit shift on pixel values in a non-transform domain (e.g., a non-frequency domain, etc.). The BL signal in the intermediate bitstream is first decoded into BL content by the BL decoder operating at the same bit depth as that of the BL signal. The BL content then can be bit-shifted right for every pixel into the target BL bit depth. A BL encoder operating at the same bit depth as the targeted BL bit depth can be deployed to encode the bit-shifted BL content into a BL signal to be sent to the post processing module of the transcoding system (500) of FIG. 6.

Likewise, in the EL processing, the bit-depth transcoder in the EL module can be configured to perform a simple bit shift on pixel values in a non-transform domain (e.g., a non-frequency domain, etc.). The EL signal in the intermediate bitstream is first decoded into EL content by the EL decoder operating at the same bit depth as that of the EL signal. The EL content then can be bit-shifted right for every pixel into the target EL bit depth. An EL encoder operating at the same bit depth as the targeted EL bit depth can be deployed to encode the bit-shifted EL content into an EL signal to be sent to the post processing module of the transcoding system (500) of FIG. 6.

In some embodiments, the RPU bit depth transcoder is configured to perform bit depth conversion, other RPU syntax conversions, etc., to convert the RPU signal in the intermediate bitstream to a targeted RPU signal to be sent to the post processing module of the transcoding system (500) of FIG. 6. For example, the RPU signal in the intermediate bitstream may comprise a piece-wise linear (PWL) function defined by one or more parameters such as pivots, offsets, levels, slopes, etc., at a first bit depth (e.g., 10 bits, etc.). These parameters of the first bit depth can be converted to parameters of a second bit depth (e.g., 8 bits, etc.) for the targeted transmission packages as represented in the following expressions, (1) through (4):

$$\text{pivot}^{(8)} = \text{pivot}^{(10)} >> 2 \quad (1)$$

$$\text{offset}^{(8)} = \text{offset}^{(10)} >> 2 \quad (2)$$

$$\text{level}^{(8)} = \text{level}^{(10)} >> 2 \quad (3)$$

$$\text{slope}^{(8)} = \text{slope}^{(10)} << 2 \quad (4)$$

wherein the right hand sides of expressions (1) through (4) represent the parameters of the second bit depth.

As used herein, the term "bit depth" refers to the number of bits provided in a coding space that provides available code words to encode or quantize image data; examples of bit depths include but are not limited to only, any of: 8 bits, 10 bits, 12 bits, or more.

In an example embodiment, the multi-layer encoder (102) is configured to receive a mezzanine package comprising a sequence of input EDR (or VDR) images. The sequence of input EDR images represents one or more scenes each of which comprises a plurality input images in the sequence of EDR images. As used herein, an "input EDR image" generally refers to wide or high dynamic range image data that may be used to derive a EDR version of a source image (which for example may be a scene-referred image captured by a high-end image acquisition device, etc.). An input EDR image may be in any color space that supports a high dynamic range color gamut.

In an example embodiment, an input EDR image decoded from the (e.g., EDR, etc.) source video content (104) is a 12+ bit YCbCr image in a YCbCr color space. In an example, each pixel represented in the input EDR image comprises code words for all channels (e.g., luminance channel Y, chroma channels Cb and Cr, etc.) defined for a color space (e.g., an YCbCr color space). Each code word comprises upsampled or downsampled code words for one or more of the channels in the color space. In some embodiments, a transcoding system as described herein can be configured to transform code words of an input EDR image from a first color space (e.g., an RGB color space, etc.) to a second different color space (e.g., a YCbCr color space, etc.). In some embodiments, a transcoding system as described herein can be configured to downsample or upsample an input EDR image in a first sampling format (e.g., in a 4:4:4 sampling format, etc.) to a second different sampling format (e.g., in a 4:2:0 sampling format, etc.). In some embodiments, a transcoding system as described herein can be configured to perform BL operations including but not limited to only, any of: perceptual quantization, gamma quantization, mapping operations, clipping operations, BL encoding operations, spatial resolution transcoding, temporal frame rate conversion, etc. In some embodiments, a transcoding system as described herein can be configured to perform one or more EL operations including but not limited to, any of: BL decoding operations, inverse mapping operations, subtraction operations, nonlinear quantization operators, EL encoding operations, spatial resolution transcoding, temporal frame rate conversion, etc.

In some embodiments, a transcoding system as described herein can be configured to generate a RPU signal comprising some or all of operational parameters used in the transcoding system as a part of a multi-layer bitstream to a downstream device (e.g., a next stage transcoding system, an end-user device, an end-user display application, etc.) including but not limited to, any of: one or more of mapping parameters, clipping parameters, exponent values used in power functions for gamma compression, inverse mapping parameters, lookup tables (LUTs), pivot values in PWL functions, non-linear quantization parameters, etc. In some embodiments, the RPU signal carries temporal frame information (e.g., scene cut information, etc.). Upon performing temporal frame rate conversion in a pass (e.g., the first pass, the second pass, etc.) of transcoding, frame skipping operations can be performed with respect to the temporal frame information carried in the RPU signal. For example, the temporal frame information can be downsampled with an integer factor for certain combinations of pre-converted and post-converted frame rates. Interpolation operations can also be performed with respect to the temporal frame information (e.g., scene cut information, etc.) carried in the RPU signal for pre-converted and post-converted frame rates with an arbitrary frame rate ratio.

One or more of the operations such as the BL encoding operations, the BL decoding operations, the EL encoding operations, etc., may be implemented using one or more of a plurality of codecs, including, but not limited to, any combination of: AVC (ISO/IEC 14496-10 versions 1-20, ITU-T Recommendation H.264), HEVC (ISO/IEC 23008-2 MPEG-H Part 2 version 1, ITU-T Recommendation H.265 (April 2013)), MPEG-2 (ISO/IEC 13818 Part 2 third edition (Oct. 1, 2013), ITU-T Recommendation H.262), VP9, VP8 (IETF RFC 6386, dated November 2011), VC-1 (SMPTE ST 421:2013), which each is hereby incorporated herein by reference for all purposes as if fully set forth herein.

In some example embodiments, one or more of linear or non-linear quantizers may be used to quantize higher bit depth (e.g., 12+ bits, etc.) image data to lower bit depth (e.g., 8 bits, etc.) image data. Different quantizers in different color spaces and/or in different color channels may be selected. For example, to alleviate/reduce/remove contouring artifacts (e.g., in smooth areas, etc.) and other artifacts, video signals may be quantized in different color spaces and/or with different quantization methods. In some embodiments, quantization as described herein may comprise one or more of: linear quantization, linear stretching, curve-based/non-uniform quantization probability-density-function (pdf) optimized quantization, vector quantization, etc. The overall optimized parameter values may be selected on the basis of any of: a frame, multiple frames, a scene, multiple scenes, etc. In some embodiments, a specific type of quantization may have a corresponding relationship with one or more types of prediction methods and/or inverse mapping.

Quantization may be performed on an individual channel basis or on two or more channels at the same time. In an example embodiment, vector quantization may be performed across two or more color channels. For example, a coordinate system (e.g., 3D Cartesian, etc.) may be setup using color channels in a color space as axes. Spatial transformation such as rotation may be performed in the coordinate system to create new axes that are defined as combinations (or sums of projections) of the two or more color channels in the color space. Code words in the two or more color channels as projected to form one of the new axes may be quantized together by a quantizer over the one of the new axes.

In some embodiments, a specific quantization method and/or optimal parameter values may be selected to compensate weaknesses of codecs. For example, a codec may not perform well in compressing black areas, and may even output contouring artifacts in a reconstructed image. Quantization as described herein may use a specific curve (e.g., Sigmoid curve, mu-law, a human-perceptual based curve, etc.) to generate image data with less contouring artifacts visible in a reconstructed image. Noise injection may also be used to reduce or remove false contouring, for example, in the reconstructed image.

In some embodiments, a color space in which quantization is applied is kept the same as a color space in which prediction is performed. Color space transformation may be performed as appropriate if a color space in which image rendering occurs is different from a color space in which quantization occurs.

9. EXAMPLE PROCESS FLOW

Figure 7:
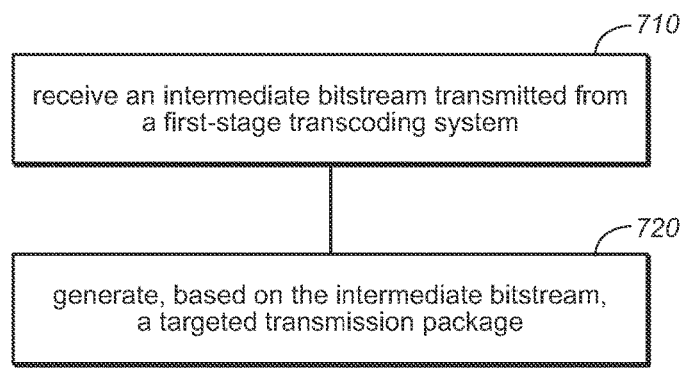
FIG. 7 illustrates an example process flow.

FIG. 7 illustrates an example process flow according to an example embodiment of the present invention. In some example embodiments, one or more computing devices or components may perform this process flow. In block 710, a transcoding system (e.g., 100-2 of FIG. 2, 300 of FIG. 3, 400 of FIG. 4, 500 of FIG. 5 and FIG. 6, etc.) receives an intermediate bitstream transmitted from a first-stage transcoding system. The intermediate bitstream is generated by the first-stage transcoding system from an initial transmission package comprising one or more input wide dynamic range images.

Here, the intermediate bitstream comprises a base layer (BL) signal and one or more enhancement layer (EL) signals. A combination of the BL signal and the one or more EL signals of the intermediate bitstream represents one or more compressed wide dynamic range images derived from the one or more input wide dynamic range images. The BL signal of the intermediate bitstream alone represents one or more compressed standard dynamic range images derived from the one or more input wide dynamic range images.

In block 720, the transcoding system generates, based on the intermediate bitstream, a targeted transmission package. The targeted transmission package comprises a BL signal and one or more EL signals. The BL signal of the targeted transmission package is directly transcoded from the BL signal of the intermediate bitstream alone.

In an embodiment, the BL signal in the intermediate bitstream corresponds to an intermediate BL bit rate; the BL signal in the targeted transmission package corresponds to a targeted BL bit rate; the BL signal of the targeted transmission package is directly transcoded from the BL signal of the intermediate bitstream alone with a bit rate transcoding operation.

In an embodiment, the BL signal in the intermediate bitstream corresponds to the same bit depth as that of the BL signal in the targeted transmission package.

In an embodiment, the BL signal in the intermediate bitstream corresponds to a different bit depth from that of the BL signal in the targeted transmission package.

In an embodiment, the BL signal in the intermediate bitstream corresponds to an intermediate BL bit depth; the BL signal in the targeted transmission package corresponds to a targeted BL bit depth; the BL signal of the targeted transmission package is directly transcoded from the BL signal of the intermediate bitstream alone with a bit depth transcoding operation and a bit rate transcoding operation.

In an embodiment, the bit depth transcoding operation comprises one or more bit shift operations on one or more of operational parameters or pixel values.

In an embodiment, the BL signal of the targeted transmission package is directly transcoded from the BL signal of the intermediate bitstream alone without content mapping any image data from the one or more EL signals of the intermediate bitstream.

In an embodiment, the transcoding system is further configured to directly transcode an EL signal in the one or more EL signals of the intermediate bitstream to an EL signal in the one or more EL signals of the targeted transmission packages.

In an embodiment, the EL signal of the targeted transmission package is directly transcoded from the EL signal of the intermediate bitstream alone without inverse mapping on any image data from the BL signal of the targeted transmission package.

In an embodiment, the transcoding system is further configured to perform: extracting, from the intermediate bitstream, an instantaneous decoder refresh (IDR) list generated by the first-stage transcoding system; performing, based on the extracted IDR list, a GOP alignment operation on BL and EL image data to be encoded into the BL and EL signals of the targeted transmission package.

In an embodiment, the transcoding system is further configured to perform: decoding the intermediate bitstream into wide dynamic range image data; decoding the BL signal of the intermediate bitstream into BL image data; generating prediction image data based at least in part on an inverse mapping of the BL image data; generating residual values based at least in part on the prediction image data and the wide dynamic range image data; applying non-linear quantization to the residual values to generate EL image data; and compressing the EL image data into the one or more EL signals of the targeted transmission package.

In an embodiment, the initial transmission package comprises display management (DM) metadata, wherein the DM metadata is included in the intermediate bitstream; the transcoding system is further configured to generate an instantaneous decoder refresh (IDR) list based at least in part on the DM metadata.

In an embodiment, a method as described herein is performed by a second-stage transcoding system, which is free from performing content mapping and noise reduction.

In an embodiment, the one or more input wide dynamic range images form a scene.

In an embodiment, the BL signal of the targeted transmission package represents one of an 8-bit signal, or a 10-bit signal.

In an embodiment, the BL signal of the intermediate bitstream represents one of an 8-bit signal, a 10-bit signal, and a 12-bit signal or greater.

In an embodiment, the initial transmission package comprises image data in a bit depth of 12 bits or more.

In an embodiment, the transcoding system is further configured to transmit the targeted transmission package to an end-user device.

In an embodiment, the targeted transmission package is one of a plurality of different targeted transmission packages corresponding to a media program; the different targeted transmission packages correspond to at least two different bit rates for transmitting to end-user devices; the transcoding system is further configured to dynamically switch from a first targeted transmission package in the plurality of targeted transmission packages to a second targeted transmission package in the plurality of targeted transmission packages for transmitting to an end-user device while streaming the media program to the end-user device.

In an embodiment, the targeted transmission package corresponds to a first streaming bit rate supported by a plurality of end-user devices; the intermediate bitstream corresponds to a second streaming bit rate higher than the first streaming bit rate range; the initial transmission package corresponds to a third streaming bit rate higher than the second streaming bit rate range.

In an embodiment, a method as described herein is performed by a second-stage transcoding system located remotely from the first-stage transcoding system; the targeted transmission package is to be streamed from the second-stage transcoding system to one or more end-user devices; a first network connection path from the second-stage transcoding system to the one or more end-user devices supports a first bit rate; a second network connection path from the first-stage transcoding system to the second-stage transcoding system supports a second bit rate higher than the first bit rate.

In an embodiment, the one or more input wide dynamic range images is perceptually encoded.

In various example embodiments, a transcoder, a codec, a system, an apparatus, or one or more other computing devices performs any or a part of the foregoing methods as described.

In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods. Note that, although separate embodiments are discussed herein, any combination of embodiments and/or partial embodiments discussed herein may be combined to form further embodiments.

10. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
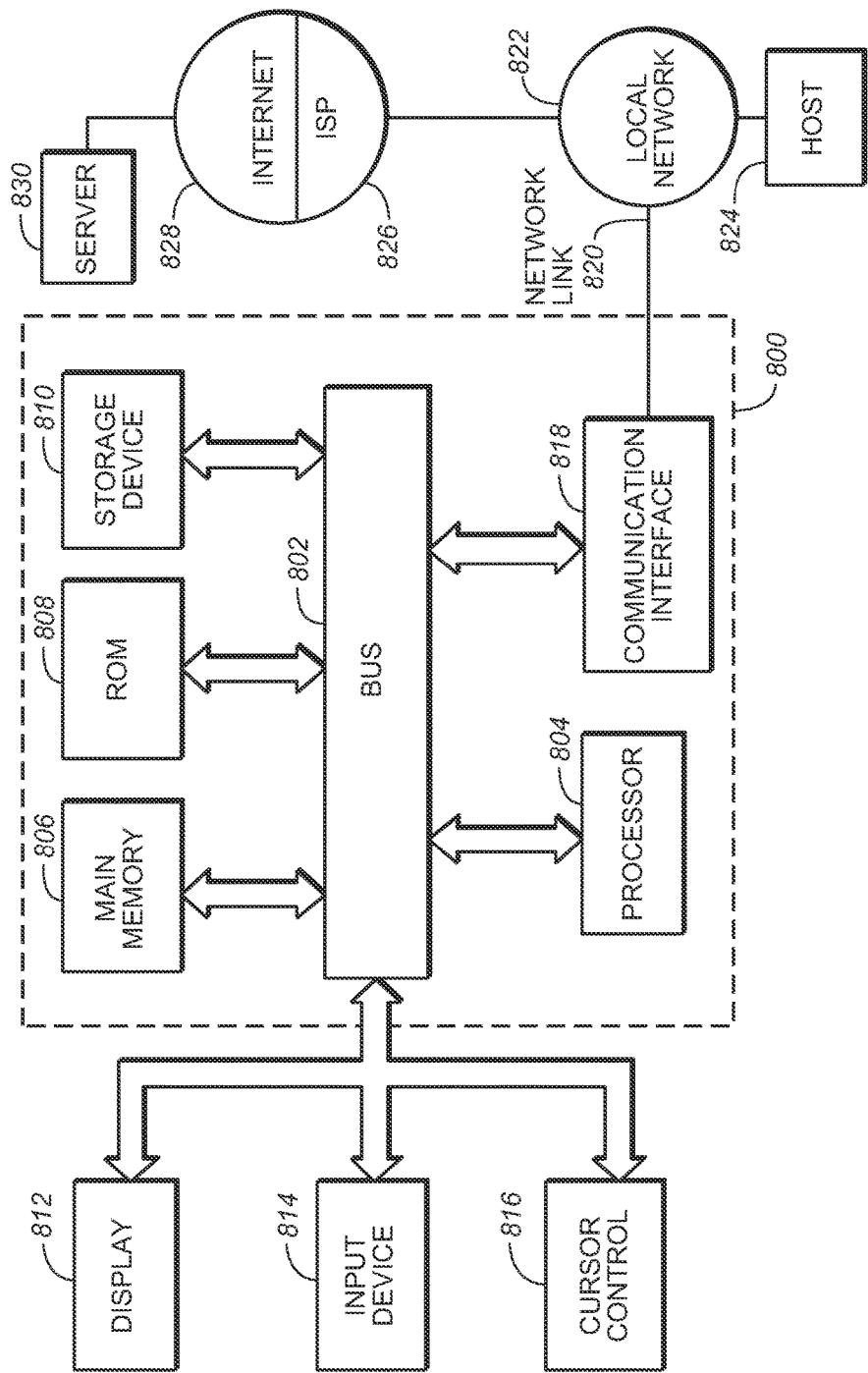
FIG. 8 illustrates an example hardware platform on which a computer or a computing device as described herein may be implemented.

For example, FIG. 8 is a block diagram that illustrates a computer system 800 upon which an example embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a liquid crystal display, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

11. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    receiving an intermediate bitstream transmitted from a first-stage transcoding system, the intermediate bitstream being generated by the first-stage transcoding system from an initial transmission package comprising one or more input wide dynamic range images, wherein the initial transmission package is encoded for a first bit rate, wherein the intermediate bitstream is encoded for an intermediate bit rate lower than the first bit rate;
    wherein the intermediate bitstream comprises an intermediate base layer (BL) signal and one or more intermediate enhancement layer (EL) signals; wherein a combination of the intermediate BL signal and the one or more intermediate EL signals of the intermediate bitstream represents one or more compressed wide dynamic range images derived from the one or more input wide dynamic range images; wherein the intermediate BL signal of the intermediate bitstream alone represents one or more compressed standard dynamic range images derived from the one or more input wide dynamic range images;
    generating, based on the intermediate bitstream, a targeted transmission package, the targeted transmission package comprising a target BL signal and one or more target EL signals, the target BL signal of the targeted transmission package being directly transcoded by a BL transcoder from the intermediate BL signal of the intermediate bitstream alone into the target BL signal in the targeted transmission package;
    wherein the BL transcoder is separate from one or more EL transcoders that directly transcode from the one or more intermediate EL signals of the intermediate bitstream into the one or more target EL signals of the targeted transmission package; wherein the BL transcoder directly transcodes the intermediate BL signal of the intermediate bitstream into the target BL signal in the targeted transmission package; and wherein the targeted transmission package is encoded for a second bit rate lower than the intermediate bit rate;
    wherein the method is performed by one or more computing devices.

2. The method as recited in claim 1, wherein the intermediate BL signal in the intermediate bitstream corresponds to an intermediate BL bit rate, wherein the target BL signal in the targeted transmission package corresponds to a targeted BL bit rate, and wherein the target BL signal of the targeted transmission package is directly transcoded from the intermediate BL signal of the intermediate bitstream alone with a bit rate transcoding operation.

3. The method as recited in claim 2, wherein the intermediate BL signal in the intermediate bitstream corresponds to the same bit depth as that of the target BL signal in the targeted transmission package.

4. The method as recited in claim 2, wherein the intermediate BL signal in the intermediate bitstream corresponds to a different bit depth from that of the target BL signal in the targeted transmission package.

5. The method as recited in claim 1, wherein the intermediate BL signal in the intermediate bitstream corresponds to an intermediate BL bit depth, wherein the target BL signal in the targeted transmission package corresponds to a targeted BL bit depth, and wherein the target BL signal of the targeted transmission package is directly transcoded from the intermediate BL signal of the intermediate bitstream alone with a bit depth transcoding operation and a bit rate transcoding operation.

6. The method as recited in claim 5, wherein the bit depth transcoding operation comprises one or more bit shift operations on one or more of operational parameters or pixel values.

7. The method as recited in claim 1, wherein the target BL signal of the targeted transmission package is directly transcoded from the intermediate BL signal of the intermediate bitstream alone without content mapping any image data from the one or more intermediate EL signals of the intermediate bitstream.

8. The method as recited in claim 1, wherein the target EL signal of the targeted transmission package is directly transcoded from the intermediate EL signal of the intermediate bitstream alone without inverse mapping on any image data from the target BL signal of the targeted transmission package.

9. The method as recited in claim 8, further comprising:
extracting, from the intermediate bitstream, an instantaneous decoder refresh (IDR) list generated by the first-stage transcoding system;
performing, based on the extracted IDR list, a GOP alignment operation on BL and EL image data to be encoded into the target BL signal and the target EL signals of the targeted transmission package.

10. The method as recited in claim 1, further comprising:
decoding the intermediate bitstream into wide dynamic range image data;
decoding the intermediate BL signal of the intermediate bitstream into BL image data;
generating prediction image data based at least in part on an inverse mapping of the BL image data;
generating residual values based at least in part on the prediction image data and the wide dynamic range image data;
applying non-linear quantization to the residual values to generate EL image data; and
compressing the EL image data into the one or more target EL signals of the targeted transmission package.

11. The method as recited in claim 10, wherein the initial transmission package comprises display management (DM) metadata, wherein the DM metadata is included in the intermediate bitstream; and further comprising: generating an instantaneous decoder refresh (IDR) list based at least in part on the DM metadata.

12. The method as recited in claim 1, wherein the method is performed by a second-stage transcoding system, and wherein the second-stage transcoding system is free from performing content mapping and noise reduction.

13. The method as recited in claim 1, wherein the method is performed by a second-stage transcoding system; and further comprising performing one or more temporal frame rate conversion operations by one or both of the first-stage transcoding system and the second-stage transcoding system to convert image data in at least one of the intermediate BL signal and the intermediate EL signals from a first frame rate to a second different frame rate in the temporal domain.

14. The method as recited in claim 1, wherein the method is performed by a second-stage transcoding system; and further comprising performing one or more spatial resolution transcoding operations by one or both of the first-stage transcoding system and the second-stage transcoding system to convert image data in at least one of the intermediate BL signal and the intermediate EL signals from a first spatial resolution to a second different spatial resolution.

15. The method as recited in claim 1, wherein the one or more input wide dynamic range images form a scene.

16. The method as recited in claim 1, wherein the target BL signal of the targeted transmission package represents one of an 8-bit signal or a 10-bit signal.

17. The method as recited in claim 1, wherein the intermediate BL signal of the intermediate bitstream represents one of an 8-bit signal, a 10-bit signal, or a 12-bit or more signal.

18. The method as recited in claim 1, wherein the initial transmission package comprises image data in a bit depth of 12 bits or more.

19. The method as recited in claim 1, further comprising transmitting the targeted transmission package to an end-user device.

20. The method as recited in claim 1, wherein the targeted transmission package is one of a plurality of different targeted transmission packages corresponding to a media program, wherein the different targeted transmission packages correspond to at least two different bit rates for transmitting to one or more end-user devices; and further comprising: dynamically switching from a first targeted transmission package in the plurality of targeted transmission packages to a second targeted transmission package in the plurality of targeted transmission packages for transmitting to an end-user device of the one or more end-user devices while streaming the media program to the end-user device.

21. The method as recited in claim 1, wherein the targeted transmission package corresponds to a first streaming bit rate supported by a plurality of end-user devices, wherein the intermediate bitstream corresponds to a second streaming bit rate higher than the first streaming bit rate range, and wherein the initial transmission package corresponds to a third streaming bit rate higher than the second streaming bit rate range.

22. The method as recited in claim 1, wherein the method is performed by a second-stage transcoding system located remotely from the first-stage transcoding system, wherein the targeted transmission package is to be streamed from the second-stage transcoding system to one or more end-user devices, wherein a first network connection path from the second-stage transcoding system to the one or more end-user devices supports a first bit rate, and wherein a second network connection path from the first-stage transcoding system to the second-stage transcoding system supports a second bit rate higher than the first bit rate.

23. The method as recited in claim 1, wherein the one or more input wide dynamic range images is perceptually encoded.

24. A transcoder performing the method as recited in claim 1.

25. A codec performing the method as recited in claim 1.

26. A system performing the method as recited in claim 1.

27. A non-transitory computer readable storage medium, storing software instructions, which when executed by one or more processors cause performance of the method recited in claim 1.

28. A computing device comprising one or more processors and one or more storage media, storing a set of instructions, which when executed by one or more processors cause performance of the method recited in claim 1.

* * * * *